United States Patent [19]

Wang

[11] Patent Number: 4,462,308
[45] Date of Patent: Jul. 31, 1984

[54] STEAM COOKER

[76] Inventor: Gung H. Wang, 8200 S. Indiana Ave., Chicago, Ill. 60619

[21] Appl. No.: 393,125

[22] Filed: Jun. 28, 1982

[51] Int. Cl.³ ............................................. A47J 37/00
[52] U.S. Cl. ..................................... 99/413; 126/369; 426/510
[58] Field of Search .................. 426/510, 511, 523; 99/410, 413, 417, 415, 418; 126/369

[56] References Cited

U.S. PATENT DOCUMENTS

| | | | |
|---|---|---|---|
| 611,705 | 10/1898 | Obermann | 99/415 |
| 2,622,591 | 12/1952 | Bramberry | 126/369 |
| 3,141,455 | 7/1964 | Dumbeck | 126/369 |
| 3,528,401 | 9/1970 | Moore | 126/369 |
| 3,808,963 | 5/1974 | Ludena | 99/417 |
| 4,164,174 | 8/1979 | Wallsten | 99/415 |

Primary Examiner—George Yeung
Attorney, Agent, or Firm—Hill, Van Santen, Steadman & Simpson

[57] ABSTRACT

A steam cooker and method whereby food loaded into an essentially imperforate cooking pot enclosed within a top access steam chamber is cooked by steam generated in the chamber and transferred through the pot walls into the food, as well as by steam directed from the chamber into cooking relation on top of the food in the pot. Between a top closure cover over the steam chamber and structure for directing the steam into the top of the cooking pot, a shallow subchamber provides for returning spent steam and condensate to the steam chamber.

20 Claims, 11 Drawing Figures

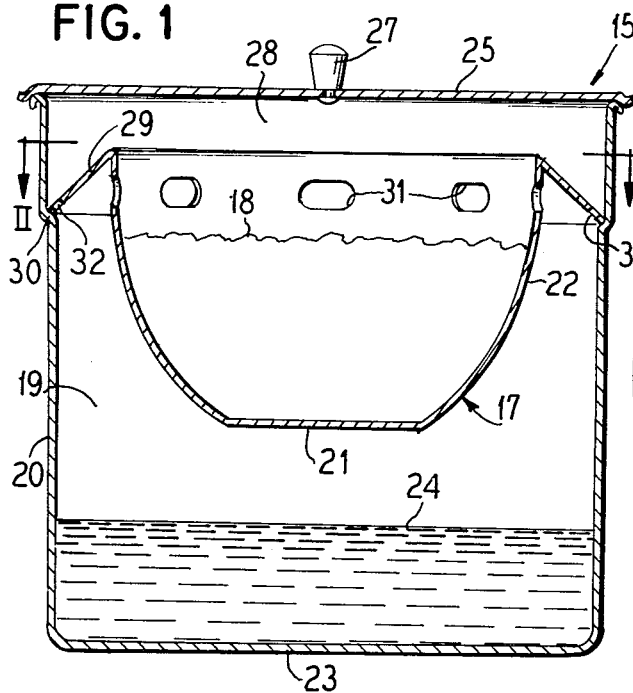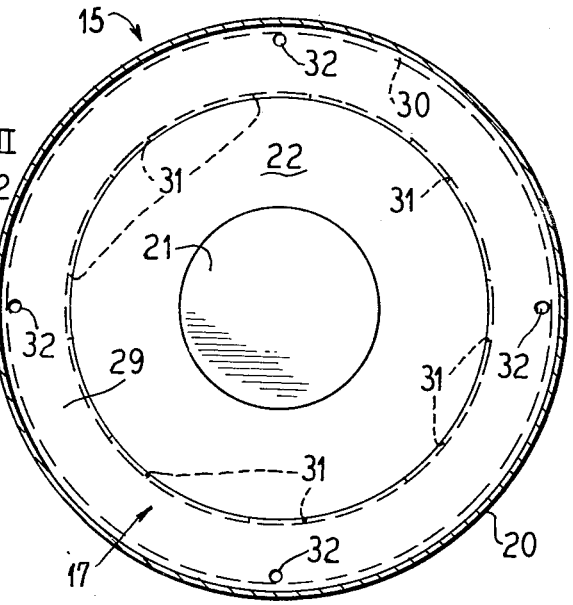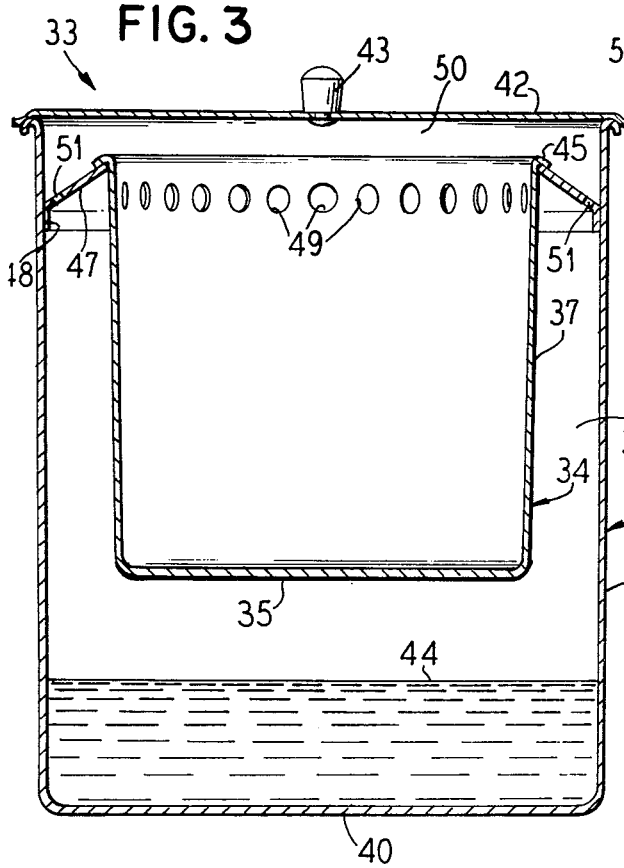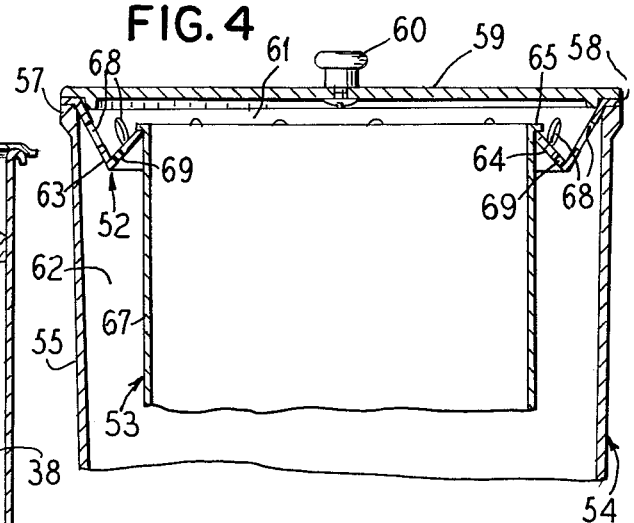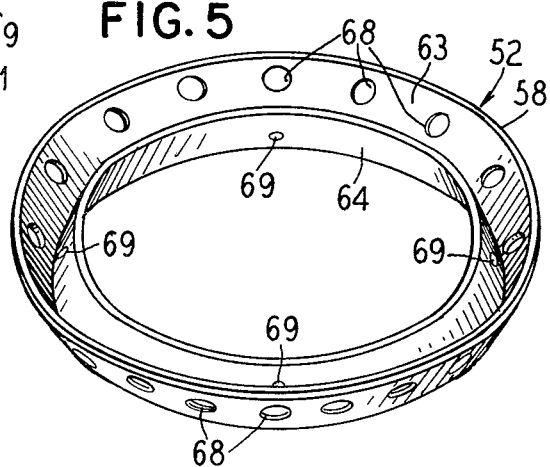

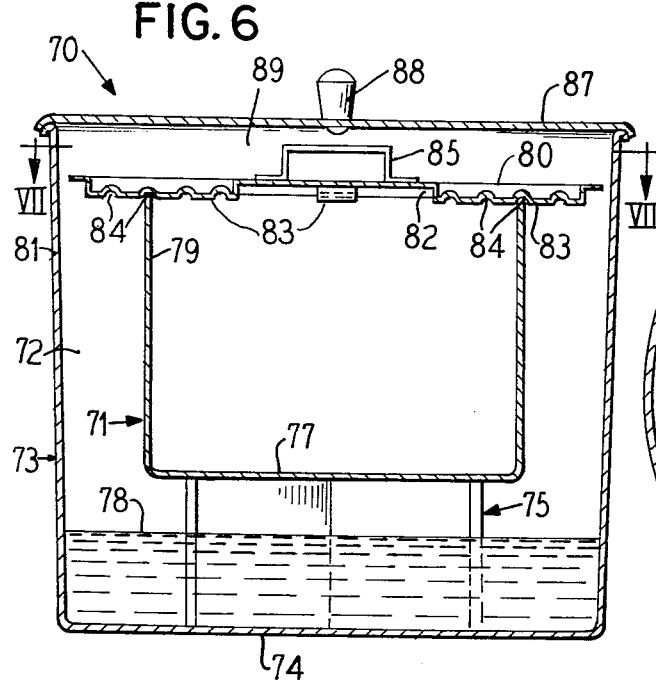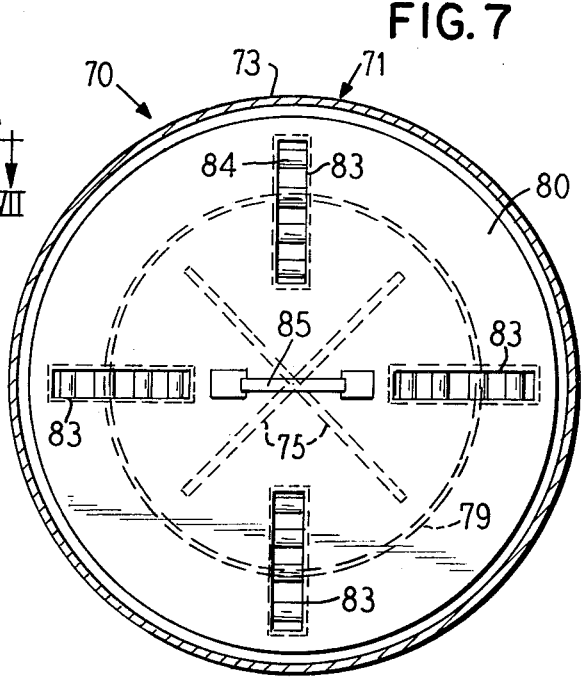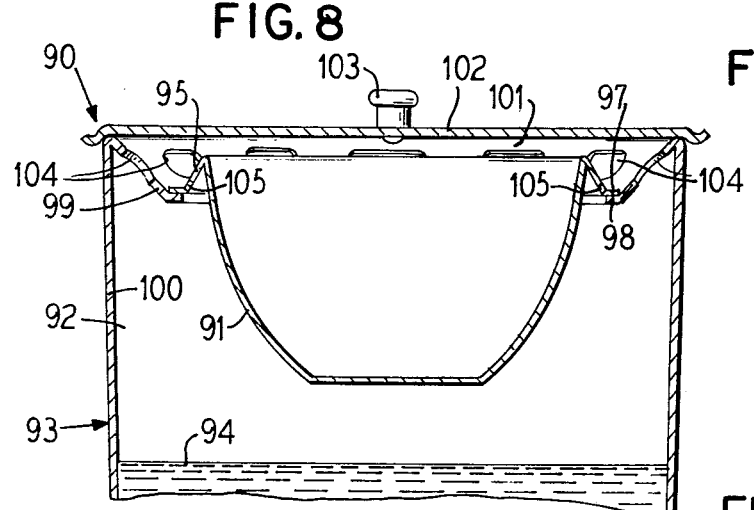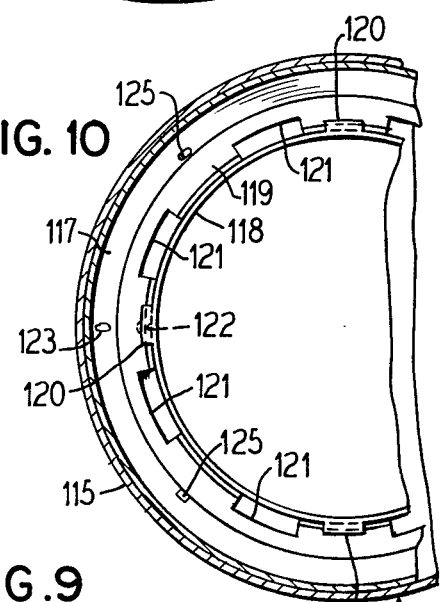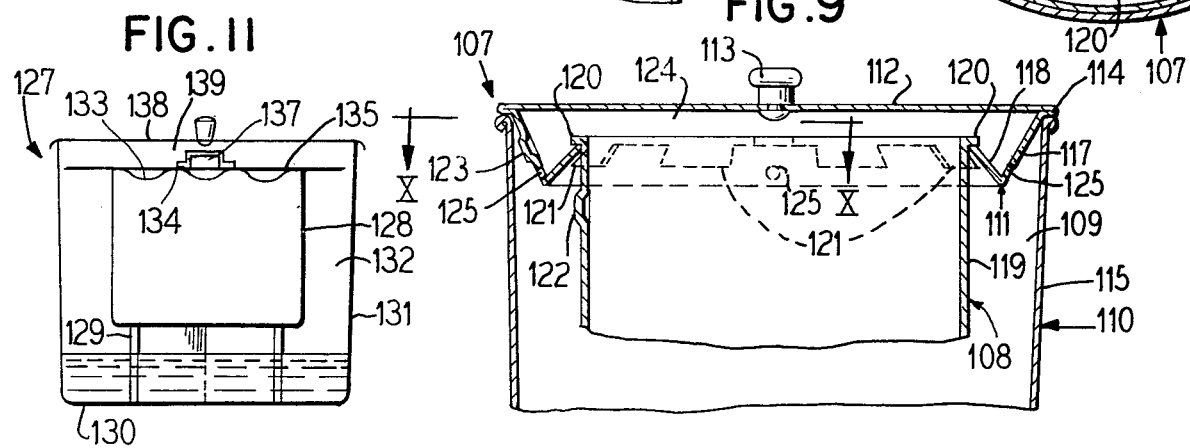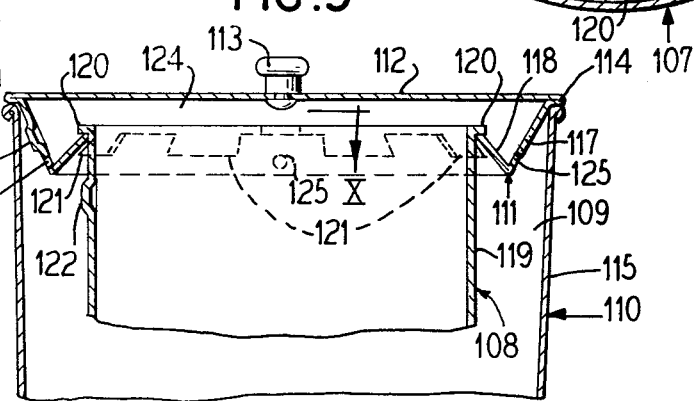

STEAM COOKER

The present invention relates to the art of steam cooking, and is more particularly concerned with a new and improved cooker and method for this purpose.

Steam cooking has been long practiced in many cultures. Where food has its own wrapper, e.g. some vegetables, fruits and unskinned meat, it may be cooked directly on or in a heat source and the internal moisture content converted to steam to effect the cooking. Often the food may be wrapped in a steam retaining wrapper, such as aluminum foil or the like, to assure steam retention and accelerate cooking.

For domestic kitchen cooking, food has often been steamed by placing it in a vessel in which the food is supported above a supply of water which is caused to boil and generate steam to envelop and cook the food. For that purpose, perforated racks, collanders, metal strainers, and the like have been used to support the food above the water, the theory being that the steam should directly reach all surfaces of the food to accelerate cooking. A major disadvantage of steam cooking in this manner is that as the cooking proceeds and juices are released from the food, they will escape into the water and may be lost if the water is not subsequently used and the nutrients in the juices salvaged in soup, gravies or the like. Moreover, much of the flavor of food is carried in the natural liquid content of the food, so that when the juices drip out, some or much of the natural food flavor may be sacrificed.

An important object of the present invention is to improve the art of steam cooking by maximizing steam cooking efficiency, preserving food nutrients and flavor in the food itself, and to accomplish this with optimum energy conservation.

To this end, the present invention provides a steam cooker, comprising an essentially imperforate cooking pot adapted to receive a load of food to be cooked, means providing a top access steam chamber for enclosing said pot and with bottom and side walls of the pot adapted for heat transfer therethrough, said steam chamber being adapted for steam cooking heat generation therein and for transferring the cooking heat through the pot walls to food contained within the pot, a removable top closure for said steam chamber, and means for directing steam from said chamber into cooking relation on top of the food in said pot.

There is also provided by the present invention a method of steam cooking, comprising loading food to be cooked into an essentially imperforate cooking pot, enclosing said pot within a top access steam chamber and with bottom and side walls of said pot adapted for heat transfer therethrough, closing the open top of the steam chamber, generating steam cooking heat in said chamber, transferring said cooking heat through the pot walls into the food, and directing steam from said chamber into cooking relation on top of said food in said pot.

Other objects, features and advantages of the invention will be readily apparent from the following description of representative embodiments thereof, taken in conjunction with the accompanying drawings, although variations and modifications may be effected without departing from the spirit and scope of the novel concepts embodied in the disclosure, and in which:

FIG. 1 is a vertical sectional detail view of a steam cooker embodying the invention;

FIG. 2 is a plan section view taken substantially along the line II—II of FIG. 1;

FIG. 3 is a vertical sectional view of a modification of the steam cooker;

FIG. 4 is a fragmentary vertical sectional view showing another modification;

FIG. 5 is a perspective view of a supporting and steam controlling ring used in the arrangement of FIG. 4;

FIG. 6 is a vertical sectional view showing yet another modification;

FIG. 7 is a sectional plan view taken substantially along the line VII—VII of FIG. 6;

FIG. 8 is a fragmentary vertical sectional view showing still another modification;

FIG. 9 is a fragmentary vertical sectional view showing a further modification;

FIG. 10 is a fragmentary sectional plan view taken substantially along the line X—X of FIG. 9; and FIG. 11 is a schematic vertical sectional detail view showing a still further modification.

Referring to FIGS. 1 and 2, a steam cooker 15 for practicing the present invention embodies an essentially imperforate cooking pot 17 which is adapted to receive a load of food 18 to be cooked. Means providing a top access steam chamber 19 comprise a vessel 20 for enclosing the pot 17; and with bottom and side walls 21 and 22, respectively, of the pot adapted for heat transfer therethrough. The steam chamber 19 is adapted for steam cooking heat generation therein and for transferring the cooking heat through the pot walls to the food 18 contained within the pot. For this purpose, the vessel 20 is adapted to receive through its bottom 23 heat from any suitable source such as a gas burner, an electrical heating unit, a bed of burning charcoal, or the like (not shown), for heating a body of water 24 within the vessel 20 to generate steam cooking heat. Top access into the chamber 19 within the vessel 20 permits insertion and removal of the pot 17. A cover or lid 25 having suitable manipulating means such as a knob 27, is provided as a top closure for the steam chamber. To minimize condensation on the inside of the cover 25, it is preferably flat, thus affording minimum condensation area. The lid may also be made from a material having a relatively low coefficient of heat transfer such as a suitable heat resistant plastic, relatively thick stainless steel, and the like.

As shown, the cooking pot 17 is preferably supported within the steam chamber vessel 20 with the bottom wall 21 and the side wall 22 of the cooking pot free within the chamber 19 and above the steam generating water 24 for free circulation of steam in contact with the pot walls for efficient cooking heat transfer through those walls to the food 18. Further, the normally open top of the pot 17 is located relatively close to but spaced below the cover 25, and a relatively shallow steam circulation subchamber 28 is provided between the pot 17 and the cover 25. For supporting the pot 17 in this orientation within the vessel 20, means are provided, in this instance, comprising an annular radially outwardly and downwardly sloping generally frustoconical flange 29 of substantial width extending from the upper edge of the pot wall 22. The outside diameter of the flange 29 is dimensioned to engage supporting shoulder means, such as a stepped shoulder 30 provided in the upper portion of the upstanding wall of the vessel 20.

The construction and arrangement of the upper portion of the pot wall 22 and the supporting rim flange 29 are such as to provide means for directing steam from the chamber 19 into cooking relation on top of the food 18 in the pot 17. To this end, the rim flange 29 is generally imperforate, and the margin of the wall 22 about the top opening of the pot 17 is provided with an annular series of spaced horizontally elongated steam circulation apertures 31 through which steam from within the chamber is directed, aided by funneling effect of the flange 29, into cooking relation on top of the food 18. By virtue of the shallow depth of the subchamber 28, the steam entering the top of the pot through the openings 31 is efficiently confined in cooking relation to the food upper surface.

As the steam which enters the subchamber 28 loses its heat, and tends toward a heavier vapor phase, it seeks to descend relative to the hotter steam which enters through the entrance holes or apertures 31. Escape of the cooled vapor and condensate from the subchamber 28 is provided for by equipping the flange 29 with a circumferentially spaced series of return ports 32 located adjacent to the lower edge of the flange 29. For maximum efficiency, there should be a substantial differential in total cross-sectional flow area between the entrance apertures 31 and the return posts 32. An efficient ratio has been determined to be about 16 to 1, so that where the entrance apertures 31 aggregate about 2 square feet area, the discharge port may aggregate about $\frac{1}{8}$ square foot. Bu way of example, there may be eight of the entrance operations 31 and four of the return parts 32. This aggregate cross-sectional flow area differential, and the relatively shallow subchamber 28 attains excellent steam circulation for top cooking the food in an efficient relation to the bottom and side cooking of the food through the walls of the cooking pot 17. Maximum cooking heat utilization with economical minimum heating energy input is thus attained.

In FIG. 3, a similar cooker 33 is shown, but instead of a generally bowl-shaped cooking pot as in FIG. 1, a relatively deep well, substantially cylindrical cooking pot 34 is provided having a bottom wall 35 and generally vertical tubular upstanding wall 37. A steam chamber 38 is provided within a steam vessel 39 substantially deeper and of larger diameter than the pot 34, and having a bottom wall 40 and substantially cylindrical upstanding wall 41, with a preferably flat cover 42 providing a closure for the normally open upper end of the vessel, the cover having a manipulating handle 43. Water in the bottom of the vessel 39 below the cooking pot 34 is adapted to be heated and converted into steam by heat applied through the bottom 40 of the vessel.

On its upper end, the pot wall 37 has a radially outwardly projecting rim lip means 45 for supporting the vessel on an annular generally frustoconical upwardly and radially inwardly projecting flange 47 carried preferably fixedly by the inside of the upper portion of the vessel wall 41 by means of a downwardly extending radially outer end attachment flange 49 secured to the vessel wall.

For directing stem from the chamber 38 into cooking relation on top of food in the pot 34, the upper portion of the pot wall 37 is provided adjacent to, but spaced below the rim lip 45, with an annular series of spaced steam entrance apertures 49. It will be observed that the flange 47 supports the upper end of the pot 34 relatively close to the cover 42 so that there is defined a relatively shallow subchamber 50 which functions substantially the same as the subchamber 28 in FIG. 1. A circumferentially spaced series of return posts 51 located adjacent to the lower edge of the flange 47 provide for escape of cooled spent vapor and condensate from the subchamber 50 to substantially the same effect as the return ports 32 in FIG. 1.

In the arrangement shown in FIGS. 4 and 5, substantially the same results are attained as in the forms of FIGS. 1 and 3 of the invention by means of an adapter ring 52 which supports an essentially imperforate cooking pot 53 in spaced relation within a steam vessel 54 having a tubular upstanding side wall 55 and a bottom wall (not shown). At its upper end, the vessel wall 55 has a rim 57 on which is supported a radially outwardly extending outer margin mounting flange 58 of the ring member 52. On the flange 58 is adapted to be engaged the rim of a substantially flat cover 59, having manipulating handle knob 60, and providing a closure for the normally open upper access end of the vessel 54.

The adapter ring 52 is adapted to support the port 53 closely adjacent to but spaced below the cover 59 in such relation as to define a relatively shallow subchamber 61 for controlled steam circulation from within a steam chamber 62 provided within the vessel 54. In this instance, the ring member 52 has an annular flange 63 which extends frustoconically downwardly and inwardly from the rim flange 58 and joins an annular radially inwardly and upwardly directed frustoconical flange 64 providing upwardly directed shoulder means on which downwardly facing shoulder means on an annular radially outwardly extending rim flange 65 on upright wall 67 of the pot 53 is engaged. For directing steam from the chamber 62 into cooking relation on top of food in the pot 53, the ring flange 63 has an annular series of spaced steam entrance apertures 68. For escape of cooled vapor and condensate from the subchamber 61, the ring flange 64 has a circumferentially spaced series of return ports 69 located adjacent to the convergence of the flanges 63 and 64. The functioning and results attained with the arrangement of FIGS. 4 and 5 are substantially the same as described for FIGS. 1 and 3.

In FIGS. 6 and 7, a steam cooker 70 adapted for practicing the present invention, embodies an essentially imperforate cooking pot 71 which is adapted to receive a load of food to be cooked similarly as in FIG. 1 and is adapted to be supported in spaced relation within a steam chamber 72 of a steam vessel 73. In this instance, bottom wall 74 of the vessel 73 carries a removable trivet-like stand 75 on which is engaged bottom wall 77 of the pot 71 which is thereby preferably maintained above the level of a body of steam generating water 78 in the bottom well of the vessel 73. For directing steam from the chamber 72 into cooking relation on top of food in the pot 71, the upper end of the pot is adapted to support a removable steam directing lid 80 which is of substantially larger diameter than the diameter of the upper end of the pot wall 79, but of slightly smaller diameter than the inside diameter of upstanding wall 81 of the vessel 73. Through this arrangement, the overhanging margin of the lid 80 is adapted to direct steam from the chamber 72 through a narrow gap 82 between the upper edge of the pot wall 79 and the lid into cooking relation on top of food in the pot 71. The gap 82 is maintained by means of radially extending spacer ribs 83 extending downwardly on the lid 80 and which may be provided by indenting the lid where the lid is made of a thin material. If the material of the lid 80 is thicker then the ribs 83 may be cast or molded thereon. Although the ribs 83 may extend diametrically all the way across the lid 80, in a preferred arrangement they extend only partway at 3 or 4 circumferentially spaced points on the lid and are relatively narrow and extend only part way inwardly from adjacent to the rim of the lid. For centering the lid 80 on the edge of the wall 79, the ribs 83 are provided with centering means which in a desirable form comprise downwardly facing transverse grooves 84 of which there may be a radially spaced series adapted to accommodate various pot upper rim diameters. A lid manipulating handle 85 may be carried by the upper side of the lid 80. A flat cover 87 having manipulating handle 88 and providing a removable top closure for the access opening into the steam chamber 72 of the vessel 73 is located in relatively closely spaced relation above the lid 80 so that a relatively shallow steam circulation subchamber 89 is defined. Cooled, higher density vapor and condensate are adapted to escape from the subchamber 89 through the narrow gap between the edge of the lid 80 and the vessel wall 81.

FIG. 8 depicts a cooker 90 embodying the invention and in which imperforate cooking pot 91 is supported in a steam chamber 92 within a steam vessel 93 and above a body of steam generating water 94 within the vessel by means of a downwardly and radially outwardly extending rim flange 95 on the upper edge of the pot 91 engaging by means of downwardly facing shoulder means provided by an annular foot flange 97 on an annular upwardly directed shoulder means 98 provided at the lower end of an inwardly and downwardly extending frustoconical supporting and steam directing flange 99 on the upper end of upstanding wall 100 of the vessel 93. A relatively shallow steam circulation subchamber 101 is defined between the top of the pot 91 and the flange 99 and a cover 102 which is desirably flat and engages removably with the upper edge of the wall 100 and has a manipulating knob handle 103. For directing steam from the chamber 92 into cooking relation on top of food within the pot 91, the flange 99 has a circumferentially spaced series of steam circulation entrance apertures 104. Escape of cooled vapor and condensate from the subchamber 101 is adapted to be effected through circumferentially spaced return ports 105 in the lower marginal portion of the flange 95. It will be understood that the function and aggregate flow area of the steam entrance port apertures 104 and the escape ports 105 should be substantially on the order of the equivalent apertures and ports in FIG. 1.

In FIGS. 9 and 10, a cooker 107 is shown in which an imperforate cooking pot 108 is supported in a steam chamber 109 within a steam vessel 110 by means of an inturned, annular, carrying, ring flange structure 111 on a cover 112 having a handle knob 113. In this instance, the flange structure 111 is formed integrally with the substantially flat cover 112 along a return bend 114 about the perimeter of the cover defining a seat for engagement with the upper edge of the upstanding wall 115 of the vessel 110. From the return bent seat 114, the flange structure 111 has an annular downwardly and radially inwardly sloping frustoconical flange portion 117 which merges with a frustoconical radially inwardly and upwardly projecting annular flange portion 118 which on its upper edge provides upwardly directed shoulder means or a cooking pot supporting seat.

At circumferentially spaced intervals, such as four, upstanding wall 119 of the pot 108 has limited width radially outwardly extending short retention lug flange projections 120 which are adapted to clear through respective ones of a circumferentially spaced series of notches 121 in the flange 118. Assembly of the pot 108 with the cover 112 is thus adapted to be effected by a relative axial assembly movement of the pot and the cover 112 wherein the lugs 120 are passed through respective ones of the notches 121, and the pot and the cover relatively turned so that the lugs 120 will rest as downwardly facing shoulder means upon the edge of one of the flanges 118 intermediate adjacent notches 121. To facilitate ascertaining proper registration of the lugs 120 with edge sections of the flange 118 between adjacent ones of the notches 121, the pot wall 119 may be provided with indexing means 122 such as a short vertical rib with which a corresponding vertical rib 123 on the ring flange 117 is adapted to be aligned when proper assembly registration has been attained by relative turning of the cover and the pot. By having the indexing marks 122 and 123 in the form of ribs, even sightless persons can determine proper indexing. An advantage of the thus effected assembly of the pot 108 and the cover 112 is that the pot can be introduced into and removed from the vessel 110 as desired by manipulation of the cover handle 113.

By preference, the notches 121 are dimensioned to afford adequate steam entrance passageway apertures for directing steam from the steam chamber 109 into a relatively shallow subchamber 124 between the cover 112 and the top of the pot 119 for circulation into cooking relation onto the top of food to be cooked in the pot 108. For escape and return of cool vapor and condensate to the chamber 109, a circumferentially spaced series of return ports 125 is provided in the ring flange 117 closely adjacent to juncture with the flange 118. The aggregate flow area ratio between the apertures provided by the notches 121 and the return ports 125 may be similar to the ratio explained in connection with FIG. 1.

A steam cooker 127 as shown in FIG. 11 is a modification upon the cooker shown in FIG. 6. In this instance, the steam cooker 127 comprises an essentially imperforate cooking pot 128 which is adapted to receive a load of food to be cooked, similarly as in FIG. 1, and is adapted to be supported by supporting means 129 in spaced relation above a bottom wall 130 of a steam vessel 131 which defines about the pot 128 a steam chamber 132. At its upper end, the cooking pot 128 has its upper end formed with an annular series of spaced upwardly opening notches 133 in a preferably undulating pattern separated by upwardly projecting lands 134 on which is supported a removable cover 135 having a central handle 137. The cover 135 is of larger diameter than the diameter of the pot 128 but of smaller diameter than the inside diameter of the vessel 131 and is supported by the upper edge of the pot 128 in relatively closely spaced relation under a removable cover 138 supported on the upper edge of the vessel 131 and the covers or lids 135 and 138 thereby defining between them a relatively shallow steam circulation subchamber 139. Cooking in the pot 128 is effected similarly as described in connection with FIG. 1, in that steam produced in the steam chamber 132 surrounds the pot 128 and steam is adapted to circulate through the apertures defined by the notches 133 into cooking relation to the upper surface of food in the pot 128. Cooled, higher density vapor and condensate are adapted to escape from the subchamber 139 through the narrow gap between the edge of the cover or lid 135 and the upstanding wall of the vessel 131.

In all forms of the invention, it may be noted that the cover on the steam vessel is supported freely in a manner to maintain a contact sealing engagement with the rim of the vessel, but excessive steam pressure may escape by steam pressure lifting of the cover. This is of advantage because in cooking food in the steam cookers of the present invention, pressure cooking is not intended, but only the steam pressure sufficient to circulate throughout the steam chamber and the over-the-food areas within the essentially imperforate cooking pots for efficient cooking, with minimum energy expenditure for retaining maximum nutrient and flavor values in the food being cooked and free from leaching losses. Pressure cooked food often attains a detectable flavor which some persons find distasteful. Steam cooking by means of the present invention avoids the pressure cooking flavor alteration. Should undesirable steam pressure develop in the steam chamber of the cooker, the lid will automatically rise and relieve the pressure, and drop with characteristic chatter so that action can be taken to reduce the steam generation energy input, such as by lowering a gas burner flame, reducing electric stove heating element energy level, or the like.

Other variations and modifications may be effected without departing from the spirit and scope of the novel concepts of this invention.

I claim as my invention:

1. A steam cooker, comprising:
   an essentially imperforate cooking receptacle adapted to receive a load of food to be cooked;
   a vessel larger than said receptacle and providing a steam chamber for receiving and enclosing said receptacle and with imperforate bottom and side walls of the receptacle adapted for heat transfer therethrough;
   said vessel having an upper end about a top access opening into said chamber;
   said steam chamber being adapted for steam cooking heat generation therein and for transferring the cooking heat through the receptacle walls to food contained within the receptacle;
   a top closure for said steam chamber removably supported upon said upper end of the vessel;
   and a generally frusto-conical supporting ring extending obliquely downwardly and inwardly from said upper end and having a lower end with upwardly directed shoulder means at an elevation substantially below said upper end and removably engaging downwardly facing shoulder means on said receptacle;
   said supporting ring having means for directing steam from said chamber into cooking relation onto food in said receptacle.

2. A steam cooker according to claim 1, wherein said top closure is substantially flat whereby to reduce condensing surface area thereof exposed to the steam chamber.

3. A steam cooker according to claim 1, wherein said supporting ring is carried by said top closure.

4. A steam cooker according to claim 1, wherein said removable top closure and said ring define a shallow steam subchamber communicating with the upper end of said receptacle.

5. A steam cooker according to claim 4, wherein said ring includes means for return of spent steam and condensate from said subchamber into said steam chamber.

6. A steam cooker according to claim 1, wherein said steam chamber vessel provides a steam generating water sump below the bottom wall of said receptacle.

7. A steam cooker according to claim 1, wherein said ring has at its upper end a horizontal radially outwardly extending flange for resting on said upper end of said vessel.

8. A steam cooker according to claim 1, wherein the ring has its upper end formed integrally with said upper end of said vessel.

9. A steam cooker according to claim 1, wherein said ring has its upper end formed integrally with the perimeter of said closure.

10. A steam cooker according to claim 1, wherein said ring has an annular series of openings therein for providing said means for directing steam.

11. A steam cooker according to claim 10, wherein said shoulder means of the ring comprises upwardly and inwardly projecting flange means having upper edge means engaging said shoulder means of the receptacle, said ring with said ring shoulder flange means defining an annular groove, and said shoulder flange means having holes therein for returning condensate to said steam chamber.

12. A steam cooker according to claim 10, wherein said shoulder means on said ring comprises a horizontal radially inwardly extending flange, said shoulder means on said receptacle comprising a generally downwardly and radially outwardly extending flange structure, said ring and said flange structure defining an upwardly opening annular channel, and said flange structure having condensate return apertures communicating with said steam chamber.

13. A steam cooker according to claim 10, wherein said ring shoulder means comprises upwardly and inwardly directed flange means having notches therein providing said means for directing steam, and said ring having condensate return ports communicating with said steam chamber.

14. For a steam cooker which comprises an essentially imperforate cooking receptacle adapted to receive a load of food to be cooked, a vessel larger than said receptacle and providing a steam chamber for receiving and enclosing said receptacle and with imperforate bottom and side walls of the receptacle adapted for heat transfer therethrough, said vessel having an upper end about a top access opening to said chamber, said steam chamber being adapted for steam cooking heat generation therein and for transferring the cooking heat through the receptacle walls to food contained within the receptacle, and a closure for said steam chamber removably supported upon said upper end of the vessel;
   a generally frusto-conical supporting ring adapted to extend obliquely downwardly and inwardly from a supported relation relative to said upper end of the vessel;
   said ring having a lower end providing upwardly oriented shoulder means for removably engaging downwardly facing shoulder means on the receptacle whereby to support the upper end of the receptacle below said closure;
   and said ring having means for directing steam from said chamber into cooking relation onto food in said receptacle.

15. Structure according to claim 14, wherein said ring has a circumferential series of openings providing said means for directing steam.

16. Structure according to claim 14, wherein said ring has a top flange for engagement with said upper end of said vessel, upwardly and inwardly directed flange means at the lower end of said ring providing said ring shoulder means for engaging the shoulder means of the receptacle, said ring having an annular series of apertures providing said means for directing steam, and said flange means and said ring providing an upwardly directed channel for receiving condensate, and openings in said channel for return of condensate to said steam chamber.

17. Structure according to claim 14, wherein said ring has at its lower end a horizontally radially inwardly extending flange providing said shoulder means on the ring.

18. Structure according to claim 14, wherein said ring has generally upwardly and inwardly directed flange means providing said shoulder means of the ring, said flange means having openings therein providing said means for directing steam.

19. Structure according to claim 18, wherein said ring has condensate return holes in its lower portion adjacent to said flange means.

20. Structure according to claim 14, wherein said shoulder means of the ring comprises an upwardly and inwardly oblique flange structure.

* * * * *